United States Patent
Tsuta et al.

(10) Patent No.: US 11,305,376 B2
(45) Date of Patent: Apr. 19, 2022

(54) FRICTION STIR WELDING TOOL

(71) Applicant: HONDA MOTOR CO., LTD., Tokyo (JP)

(72) Inventors: Keisuke Tsuta, Wako (JP); Mitsuru Sayama, Wako (JP); Akiyoshi Miyawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 16/832,908

(22) Filed: Mar. 27, 2020

(65) Prior Publication Data
US 2020/0306873 A1 Oct. 1, 2020

(30) Foreign Application Priority Data

Mar. 29, 2019 (JP) .............................. JP2019-067735

(51) Int. Cl.
*B23K 20/00* (2006.01)
*B23K 20/12* (2006.01)

(52) U.S. Cl.
CPC ................................ *B23K 20/1255* (2013.01)

(58) Field of Classification Search
CPC ............ B23K 20/1255; B23K 20/1225; B23K 20/129; B23K 2101/24; B23K 2101/36; B23K 20/124; B23K 20/126; B23K 20/1265; B23K 2101/06; B23K 2103/10; B23K 37/0531; B23K 37/06
See application file for complete search history.

(56) References Cited

U.S. PATENT DOCUMENTS

| | | | |
|---|---|---|---|
| 8,104,664 B2* | 1/2012 | Kato | B23K 20/1265 228/112.1 |
| 8,955,415 B2* | 2/2015 | Lin | B25B 27/18 81/53.2 |
| 2008/0011810 A1* | 1/2008 | Burford | B23K 20/1255 228/2.1 |
| 2008/0251571 A1* | 10/2008 | Burford | B23K 20/1255 228/114.5 |

(Continued)

FOREIGN PATENT DOCUMENTS

| | | |
|---|---|---|
| CN | 103521912 A | 1/2014 |
| CN | 203830901 U | 9/2014 |
| JP | 2008-307606 A | 12/2008 |

OTHER PUBLICATIONS

Office Action including search report dated Jun. 9, 2021 issued over the corresponding Chinese Patent Application No. 202010232090.2 with an English translation of the pertinent portion.

*Primary Examiner* — Erin B Saad
(74) *Attorney, Agent, or Firm* — Carrier Blackman & Associates, P.C.; Joseph P. Carrier; Jeffrey T. Gedeon

(57) ABSTRACT

A friction stir welding tool includes a probe having a front end surface and an outer circumferential surface. The outer circumferential surface has, formed therein, outer circumferential recesses extending to the front end surface. The friction stir welding tool is configured to rotate the probe about a rotation axis, and embed the probe inside a workpiece during rotation of the probe to thereby weld the workpiece. A front end recess is formed in the front end surface, and the front end recess extends to the outer circumferential surface in a manner that the front end recess does not communicate with the outer circumferential recesses.

8 Claims, 7 Drawing Sheets

(56) References Cited

U.S. PATENT DOCUMENTS

| | | | |
|---|---|---|---|
| 2011/0101071 A1* | 5/2011 | Kato | B23K 20/1255 228/2.1 |
| 2014/0217151 A1* | 8/2014 | Miyahara | B23B 31/11 228/2.1 |
| 2019/0076957 A1* | 3/2019 | Severson | B23K 20/1255 |
| 2020/0306872 A1* | 10/2020 | Sayama | B23K 20/1255 |
| 2020/0306873 A1* | 10/2020 | Tsuta | B23K 20/1255 |
| 2020/0306874 A1* | 10/2020 | Tsuta | B23K 20/1255 |
| 2020/0306875 A1* | 10/2020 | Tsuta | B23K 20/1255 |
| 2020/0306876 A1* | 10/2020 | Tsuta | B23K 20/1255 |

* cited by examiner 10 (34)

10 (34)

FRICTION STIR WELDING TOOL

CROSS-REFERENCE TO RELATED APPLICATION

This application is based upon and claims the benefit of priority from Japanese Patent Application No. 2019-067735 filed on Mar. 29, 2019, the contents of which are incorporated herein by reference.

BACKGROUND OF THE INVENTION

Field of the Invention

The present invention relates to a friction stir welding tool which includes a probe having a front end surface and an outer circumferential surface, and welds a workpiece by rotating the probe about a rotation axis and embedding the probe inside the workpiece during rotation of the probe.

Description of the Related Art

Japanese Laid-Open Patent Publication No. 2008-307606 discloses, in FIG. 9 and paragraph [0007], a friction stir welding tool having outer circumferential recesses in an outer circumferential surface of a probe. The outer circumferential recesses extend along the rotation axis of the probe to a front end surface of the probe.

SUMMARY OF THE INVENTION

In the above described friction stir welding tool described above, material of the workpiece softened by friction heat of the probe is taken into the outer circumferential recesses from a lateral side of the probe, and it is possible to generate plastic flow of the softened material toward the front end of the probe. However, it may not be possible to generate plastic flow of a sufficient quantity of softened material toward the front end of the probe by only forming the outer circumferential recesses, and it may not be possible to achieve the suitable welding quality.

Further, since only edges forming front end edge portions of the outer circumferential recesses are formed in the front end surface of the probe, it is possible to effectively machine the workpiece by the edges at the front end of the probe.

The present invention has been made taking such a problems into consideration, and an object of the present invention is to provide a friction stir welding tool which makes it possible to increase the machining speed of a workpiece, and achieve the suitable welding quality.

According to an aspect of the present invention, a friction stir welding tool is provided. The friction stir welding tool includes a probe having a front end surface and an outer circumferential surface. The outer circumferential surface includes, formed therein, an outer circumferential recess extending to the front end surface, and the friction stir welding tool is configured to rotate the probe about a rotation axis, and embed the probe inside a workpiece during rotation of the probe to thereby weld the workpiece. A front end recess is formed in the front end surface, and the front end recess extends to the outer circumferential surface in a manner that the front end recess does not communicate with the outer circumferential recess.

In the present invention, since the probe has, formed in the front end surface, the front end recess which does not communicate with the outer circumferential recess, it is possible to machine the workpiece by the edge of the front end recess. Accordingly, it is possible to increase the machining speed of the workpiece. Further, since the front end recess extends to the outer circumferential surface of the probe, it is possible to generate plastic flow of the softened material, which lies outside the probe, toward the center (rotation axis) of the probe by the outer circumferential recess. Thus, since it is possible to effectively stir the softened material on the front end side of the probe, it is possible to achieve a desired welding quality.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a friction stir welding tool according to the present invention will be described in relation to a friction stir welding system with reference to the accompanying drawings.

Figure 1:
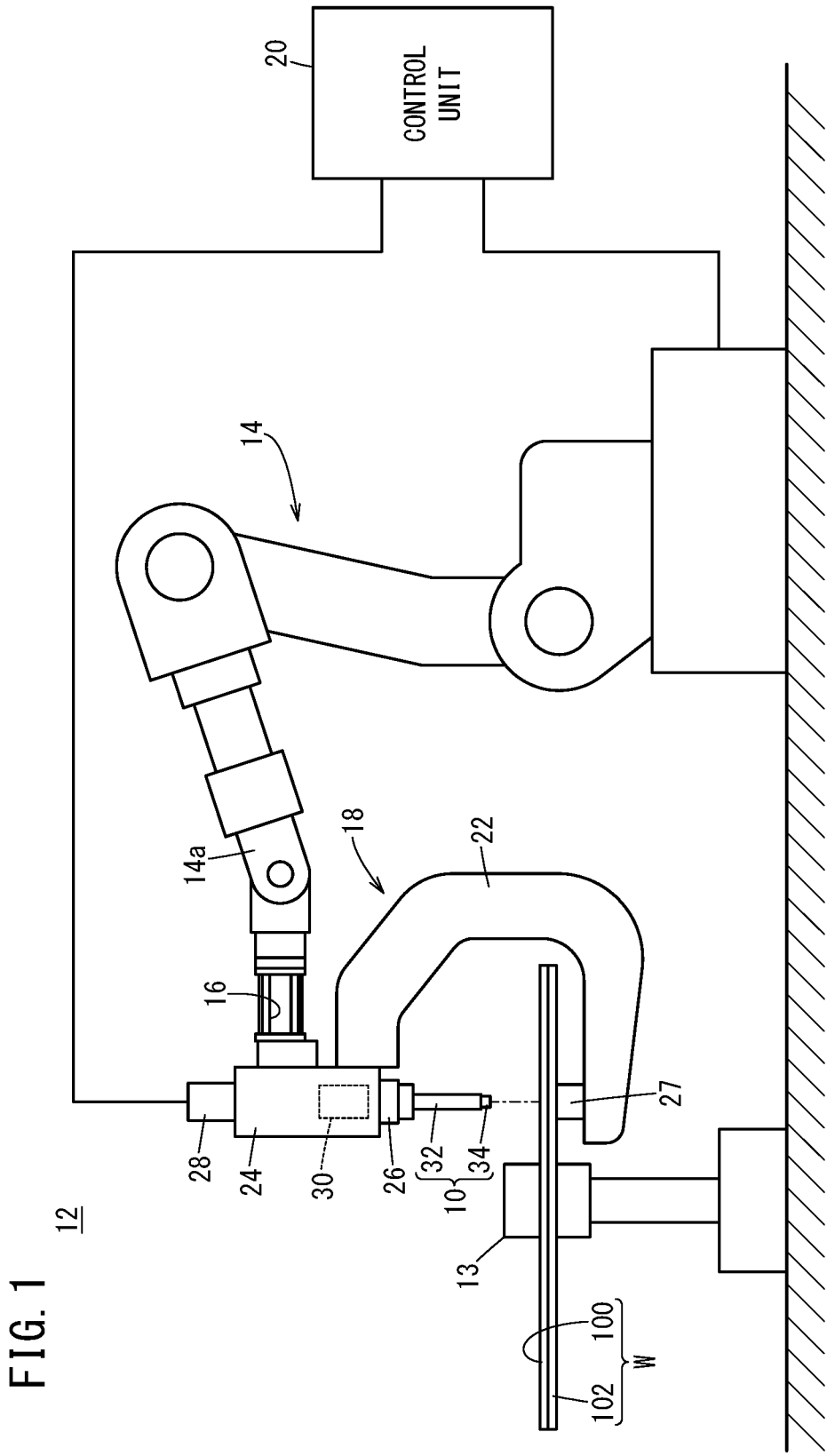
FIG. 1 is a view schematically showing overall structure of a friction stir welding system including a friction stir welding tool according to an embodiment of the present invention.

As shown in FIG. 1, a friction stir welding system 12 is configured to perform friction stir welding (FSW) of a workpiece W by, while rotating a friction stir welding tool 10 (hereinafter also referred to as the "welding tool 10"), pressing the friction stir welding tool 10 against the workpiece W.

For example, the workpiece W includes a first member 100 in the form of a plate, and a second member 102 in the form of a plate. In the state where the first member 100 and the second member 102 are stacked together, the workpiece W is fixed to a fixing base 13.

Each of the first member 100 and the second member 102 is made of metal material such as aluminum, magnesium, copper, iron, titanium, or alloy of these materials, etc. The first member 100 and the second member 102 may be made of the same material, or may be made of different materials. It should be noted that at least one of the first member 100 and the second member 102 may be made of resin material. The size and the shape of the first member 100 and the second member 102 may be determined as necessary.

The friction stir welding system 12 includes an industrial multi-joint robot 14, a welding device body 18 provided at a front end of a robot arm 14a of the robot 14 through a connector 16, the welding tool 10 detachably attached to the welding device body 18, and a control unit 20 which controls the entire system totally.

The robot 14 adjusts the position and the orientation of the welding device body 18 relative to the workpiece W to move the welding tool 10 relative to the workpiece W. Specifically, in the case of performing line welding of the workpiece W, the robot 14 adjusts the position and the orientation of the welding device body 18 in a manner that the welding tool 10 moves in a welding direction (in a direction indicated by an arrow F in FIG. 4) relative to the workpiece W. That is, the robot 14 functions as means for moving and tilting the welding tool 10.

The welding device body 18 includes a C-shaped support arm 22, a drive unit 24 provided at one end of the support arm 22, a chuck 26 provided for the drive unit 24 to clamp the welding tool 10, and a receiver member 27 provided at the other end of the support arm 22.

Figure 2:
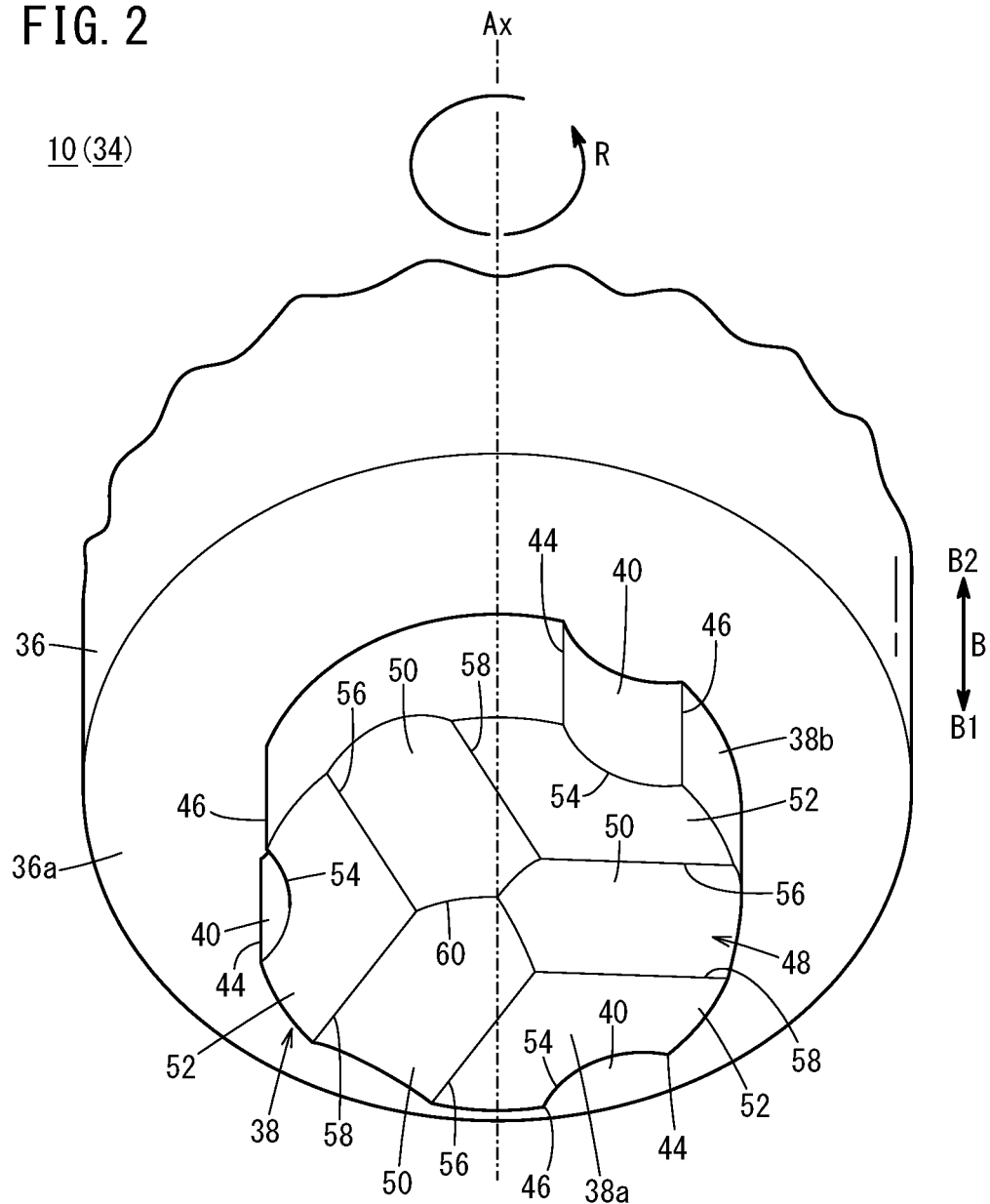
FIG. 2 is a partial perspective view showing the friction stir welding tool.

The drive unit 24 includes a rotary motor 28 for rotating the welding tool 10 attached to the chuck 26 in a predetermined rotation direction (in a direction indicated by an arrow R in FIG. 2), and an actuator 30 for moving the welding tool 10 back and forth in a direction of a rotation axis Ax (in a direction indicated by an arrow B in FIG. 2). At the time of performing friction stir welding of the workpiece W, the receiver member 27 is positioned opposite to the chuck 26 (welding tool 10) such that the workpiece W is positioned between the receiver member 27 and the chuck 26. The receiver member 27 receives a pressing force (pressure force) applied from the welding tool 10 to the workpiece W.

The welding tool 10 includes a substantially hollow-cylindrical holder 32 and a tool 34 detachably attached to the holder 32. The proximal end of the holder 32 is clamped by the chuck 26. The tool 34 can be attached to a front end of the holder 32 coaxially with the holder 32. The tool 34 is consumable. When the tool 34 is worn out as a result of friction stir welding, the tool 34 is replaced with new one.

Figure 3A:
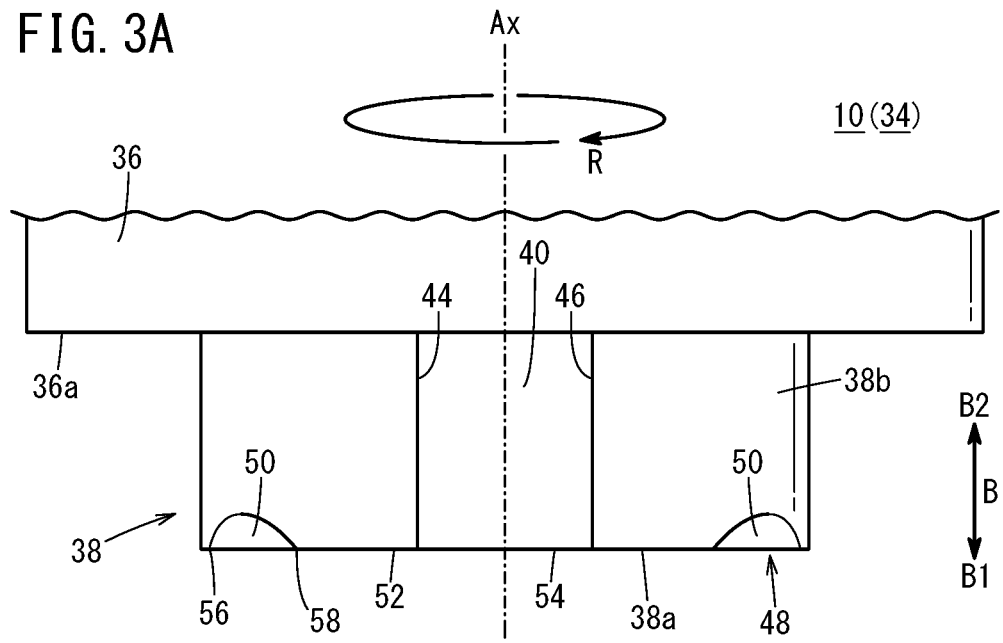
FIG. 3A is a side view showing the friction stir welding tool in FIG. 2.
Figure 3B:
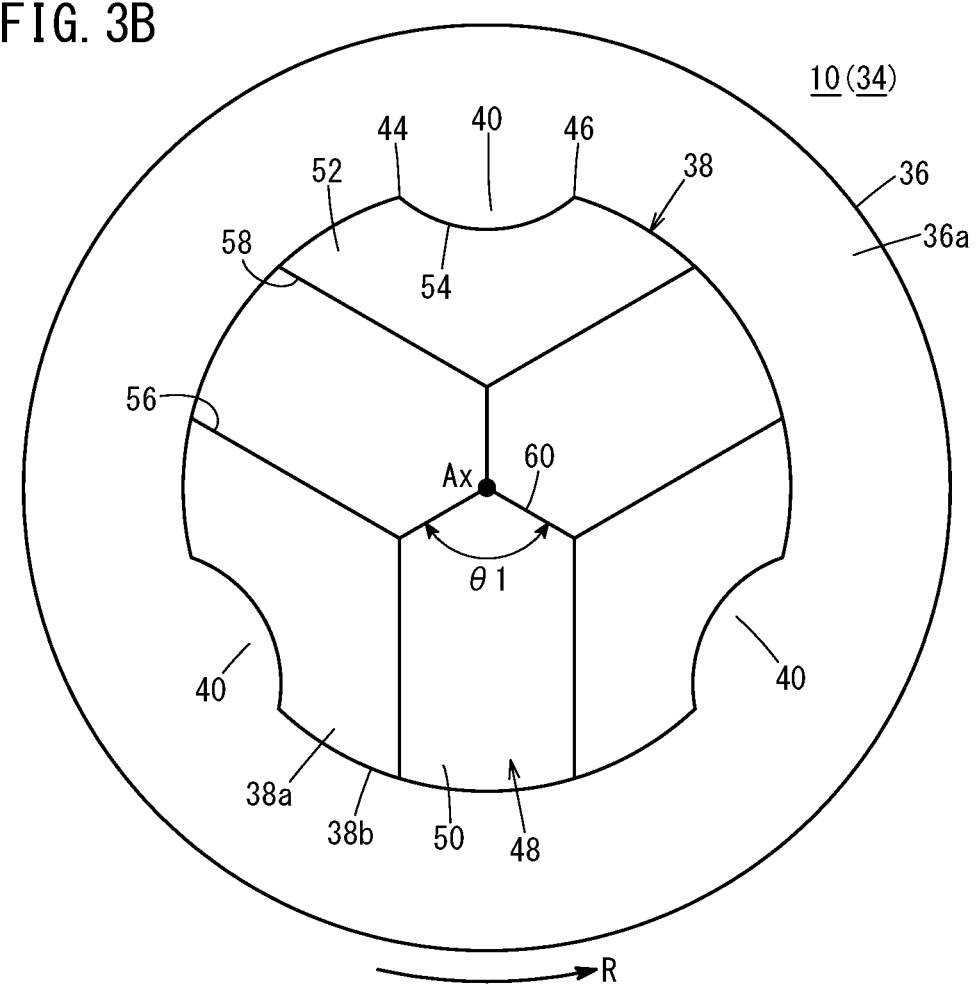
FIG. 3B is a view showing the friction stir welding tool in FIG. 2, where the friction stir welding tool is viewed from a front end.

As shown in FIGS. 2 to 3B, the tool 34 includes a substantially cylindrical shoulder 36, and a small diameter probe 38 provided on a front end surface 36a of the shoulder 36. The welding tool 10 welds the workpiece W by rotating the probe 38 in the direction indicated by the arrow R about the rotation axis Ax and embedding the probe 38 inside the workpiece W during rotation of the probe 38.

The tool 34 is produced by machining (cutting) cylindrical metal material. It should be noted that the tool 34 may be produced by a method other than machining (e.g., by means of casting, stacking, etc.). Examples of materials suitably employed in the tool 34 includes tool steels having hardness higher than that of the workpiece W, and having excellent heat resistance and wear resistance. It should be noted that the materials of the tool 34 are not limited to the tool steels, and can be determined as necessary.

The proximal end (end in a direction indicated by an arrow B2) of the shoulder 36 is detachably attached to the holder 32 (see FIG. 1). The front end surface 36a of the shoulder 36 (end surface in a direction indicated by an arrow B1) has a flat shape (see FIGS. 2 and 3A).

The probe 38 protrudes from the front end surface 36a of the shoulder 36 in a front end direction (indicated by the arrow B1) (see FIGS. 2 and 3A). The probe 38 is provided coaxially with the shoulder 36. The outer diameter and the protruding length of the probe 38 can be determined as necessary depending on the shape, the size, the material, etc. of the workpiece W as a welding target.

The probe 38 has a cylindrical shape, and includes a front end surface 38a and an outer circumferential surface 38b. A plurality of (three in the illustrated embodiment) outer circumferential recesses 40 (side surface grooves) extending to the front end surface 38a along the rotation axis Ax of the probe 38 are formed in the outer circumferential surface 38b of the probe 38. Each of the outer circumferential recesses 40 is in the form of a groove.

The plurality of outer circumferential recesses 40 are arranged at equal intervals of angle (at intervals of 120° in the illustrated embodiment) in a circumferential direction of the probe 38 (see FIGS. 2 and 3B). Each of the outer circumferential recesses 40 has a substantially constant width from the outer circumferential surface 38b toward the front end surface 38a of the probe 38. The proximal end of each of the outer circumferential recesses 40 is positioned at the proximal end of the probe 38.

In FIGS. 2 and 3A, first outer circumferential edges 44 and second outer circumferential edges 46 are formed in the outer circumferential surface 38b of the probe 38. The first outer circumferential edge 44 forms an edge portion of each of the outer circumferential recesses 40 that is positioned on the forward side in the rotation direction of the probe 38 (indicated by an arrow R). The first outer circumferential edge 44 extends in parallel to the rotation axis Ax of the probe 38. The proximal end of the first outer circumferential edge 44 (end in the direction indicated by the arrow B2) is positioned at the proximal end of the probe 38. The front end of the first outer circumferential edge 44 (end in the direction indicated by the arrow B1) is positioned in the front end surface 38a of the probe 38.

The second outer circumferential edge 46 forms another edge portion of each of the outer circumferential recesses 40 that is positioned on the rearward side in the rotation direction of the probe 38 (direction opposite to the direction indicated by the arrow R). The second outer circumferential edge 46 extends in parallel to the rotation axis Ax of the probe 38. The proximal end of the second outer circumferential edge 46 (end in the direction indicated by the arrow B2) is positioned at the proximal end of the probe 38. The front end of the second outer circumferential edge 46 (end in the direction indicated by the arrow B1) is positioned in the front end surface 38a of the probe 38.

As shown in FIGS. 2 and 3B, the rotation axis Ax is positioned at the center of the front end surface 38a of the probe 38. A front end recess 48 is formed in the front end surface 38a of the probe 38. The front end recess 48 extends to the outer circumferential surface 38b in a manner that the front end recess 48 does not communicate with the outer circumferential recesses 40. The front end recess 48 includes a plurality of (three in the illustrated embodiment) front end grooves 50 extending in the radially outward direction of the probe 38 from the center of the front end surface 38a to the outer circumferential surface 38b. The front end recess 48 is formed rotationally symmetrical about the rotation axis Ax.

The front end groove 50 is positioned between the outer circumferential recesses 40 that are adjacent to each other in the circumferential direction of the probe 38. The plurality of front end grooves 50 have the same structure. The wall surface of the front end groove 50 has a circular arc shape in lateral cross section. It should be noted that the lateral cross sectional shape of the wall surface of the front end groove 50 can be determined as necessary, and may be a U-shape or a V-shape, etc. Portions of the front end surface 38a of the probe 38 other than the front end groove 50 and the outer circumferential recesses 40 are formed as flat surfaces extending in a direction perpendicular to the rotation axis Ax.

Claws 52 are formed in the front end surface 38a of the probe 38, between the front end grooves 50 that are adjacent to each other in the circumferential direction. The outer circumferential recess 40 is formed in the outer circumferential surface 38b of each claw 52. The number of claws 52 corresponds to the number of the front end grooves 50.

The front end surface 38a of the probe 38 has formed thereon outer front end edges 54, first groove edges 56, second groove edges 58, and third groove edges 60. The outer front end edge 54 forms a front end edge portion of the outer circumferential recess 40. The outer front end edge 54 couples the front end of the first outer circumferential edge 44 and the front end of the second outer circumferential edge 46 together. The outer front end edge 54 (edge line) is curved so as to be convex inward, i.e., convex toward the rotation axis Ax. The curvature of the outer front end edge 54 can be determined as necessary.

The first groove edge 56 forms a side edge portion of the front end groove 50 that is positioned on the forward side in the rotation direction of the probe 38 (in the direction indicated by the arrow R). The second groove edge 58 forms another side edge portion of the front end groove 50 that is positioned on the rearward side in the rotation direction of the probe 38 (in the direction opposite to the direction indicated by the arrow R). The first groove edge 56 and the second groove edge 58 extend in parallel to each other on both sides of the front end groove 50. In the front end grooves 50 that are adjacent to each other, the inner end, which is positioned on the central side of the probe 38, of the first groove edge 56 of one of the front end grooves 50 is coupled to the inner end, which is positioned on the central side of the probe 38, of the second groove edge 58 of the other of the front end grooves 50.

The third groove edge 60 is a ridge line extending straight from the center of the front end surface 38a toward the coupling part where the first groove edge 56 and the second groove edge 58 are coupled together. An angle θ1 formed between the third groove edges 60 that are adjacent to each other is set to be 120°.

Next, an example of lap welding the first member 100 (e.g., an iron plate) and the second member 102 (an aluminum alloy plate) of the workpiece W together using the above described welding tool 10 will be described.

Figure 4:
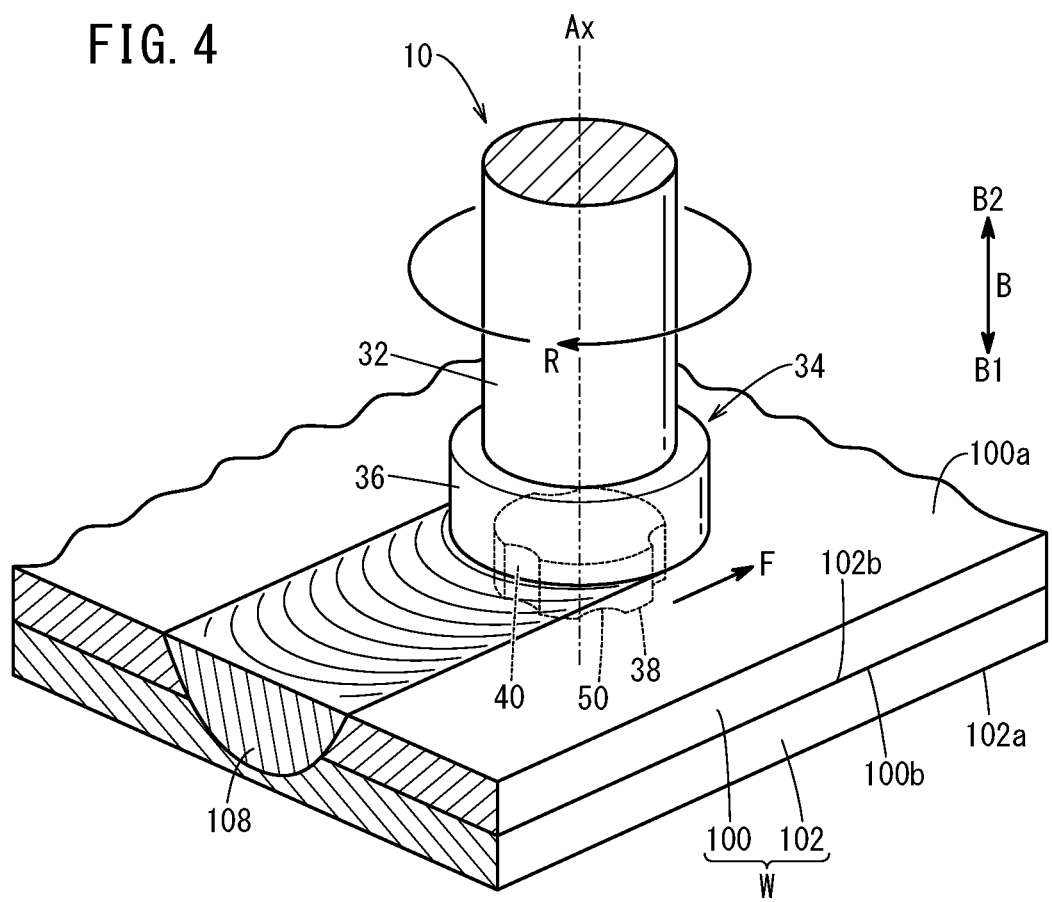
FIG. 4 is a perspective view showing lap welding using the friction stir welding tool shown in FIG. 2.
Figure 5:
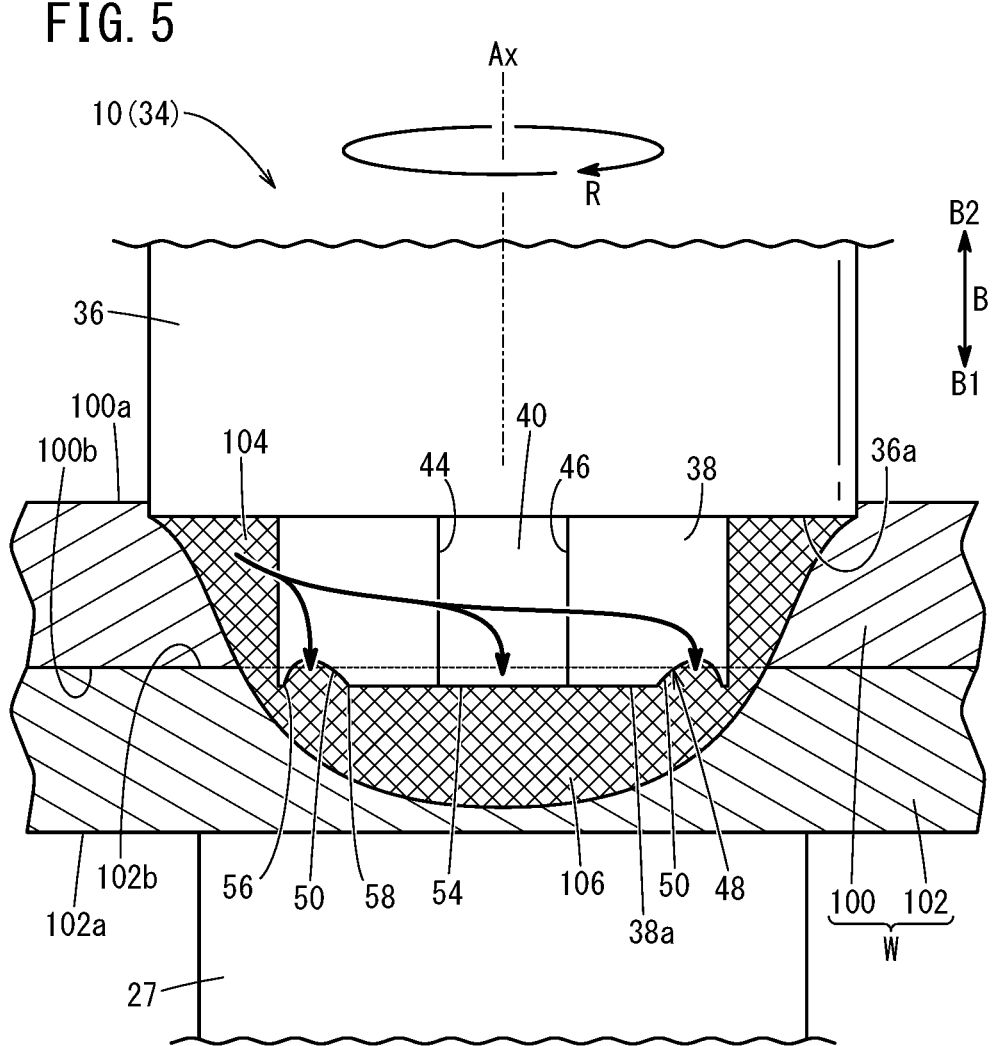
FIG. 5 is a cross sectional view showing lap welding in FIG. 4.

In this case, in FIG. 1, in the state where the first member 100 and the second member 102 are stacked together, the workpiece W is fixed to the fixing base 13. Specifically, as shown in FIGS. 4 and 5, one surface (first outer surface 100a) of the first member 100 faces the welding tool 10. The other surface (first inner surface 100b) of the first member 100 contacts one surface (second inner surface 102b) of the second member 102. The other surface (second outer surface 102a) of the second member 102 contacts the receiver member 27.

Then, the control unit 20 controls driving of the drive unit 24 to move the welding tool 10 toward the workpiece W (in the direction indicated by the arrow B1) while rotating the welding tool 10, and presses the front end surface 38a of the probe 38 against the first outer surface 100a of the first member 100.

As a result, as shown in FIG. 5, the probe 38 is inserted into the first member 100 while the probe 38 is machining the first member 100. Specifically, the outer front end edge 54, the second groove edge 58, the third groove edge 60, and the second outer circumferential edge 46 machine the first member 100. At this time, since frictional heat is produced between the probe 38 and the first member 100, the portion of the first member 100 around the probe 38 is softened.

Then, when the front end surface 38a of the probe 38 reaches the second inner surface 102b of the second member 102, the probe 38 is inserted into the second member 102 while machining the second member 102. At this time, since frictional heat is produced between the probe 38 and the second member 102 and the frictional heat produced in the first member 100 is transmitted to the second member 102, the portion of the second member 102 around the probe 38 is softened. Then, the probe 38 is embedded in the workpiece W completely, and the front end surface 36a of the shoulder 36 is brought into contact with the first outer surface 100a of the first member 100.

The softened portion of the first member 100 (first softened material 104) and the softened portion of the second member 102 (second softened material 106) are dragged by rotation of the probe 38 to flow plastically, and stirred together.

Specifically, the first softened material 104 present on the lateral side of the probe 38 is taken into each of the plurality of outer circumferential recesses 40. The first softened material 104 taken into each of the outer circumferential recesses 40 flows plastically in the front end direction of the probe 38 (in the direction indicated by the arrow B1), and the first softened material 104 is mixed with (stirred with) the second softened material 106 on the front end side of the probe 38. Further, the first softened material 104 present on the lateral side of the probe 38 is guided toward the center of the probe 38 through each of the front end grooves 50. The first softened material 104 in each of the front end grooves 50 is brought into contact with the third groove edge 60, and flows plastically in the front end direction of the probe 38 (in the direction indicated by the arrow B1), and the first softened material 104 is mixed with (stirred with) the second softened material 106 on the front end side of the probe 38.

Then, as shown in FIG. 4, by moving the welding tool 10 in the welding direction (in the direction indicated by an arrow F) while maintaining rotation and pressing of the welding tool 10, the first member 100 and the second member 102 are welded together integrally by friction stir welding. As a result, a joint portion 108 (joint bead) is formed in the workpiece W.

In this case, the welding tool 10 according to the embodiment of the present invention offers the following advantages.

The probe 38 has, formed in the outer circumferential surface 38b, the outer circumferential recesses 40 that extend to the front end surface 38a. The probe 38 has, formed in the front end surface 38a, a front end recess 48 that extends to the outer circumferential surface 38b in a manner that the front end recess 48 does not communicate with the outer circumferential recesses 40.

In the structure, it is possible to machine the workpiece W by the edges (in particular, the second groove edge 58 and the third groove edge 60) of the front end recess 48. In this manner, it is possible to increase the machining speed of the workpiece W. Further, since the front end recess 48 extends to the outer circumferential surface 38b of the probe 38, the first softened material 104 outside the probe 38 can flow plastically toward the front end of the probe 38 by the front end recess 48. Therefore, since it is possible to effectively stir the first softened material 104 and the second softened material 106 together on the front end side of the probe 38, it is possible to achieve the suitable welding quality.

The front end recess 48 includes the front end groove 50 extending in the radially outward direction of the probe 38 from the center of the front end surface 38a to the outer circumferential surface 38b.

In the structure, it is possible to smoothly guide the first softened material 104 present outside the probe 38 to the central part of the front end surface 38a through the front end groove 50.

The plurality of (three) front end grooves 50 are provided, and the third groove edge 60 is formed in the front end surface 38a. The third groove edge 60 extends from the center of the front end surface 38a in a manner to separate the front end grooves 50 that are adjacent to each other.

In the structure, the first softened material 104 in the front end groove 50 is brought into contact with the third groove edge 60, and the first softened material 104 can flow plastically in the front end direction of the probe 38. Therefore, it is possible to stir the first softened material 104 and the second softened material 106 more effectively in the front end direction of the probe 38.

The plurality of (three) outer circumferential recesses 40 are provided in the circumferential direction of the probe 38, and the front end groove 50 is positioned between the adjacent outer circumferential recesses 40.

In the structure, it is possible to efficiently generate plastic flow of the first softened material 104 present on the lateral side of the probe 38 in the front end direction of the probe 38 by the outer circumferential recesses 40 and the front end groove 50.

First Modified Embodiment

Next, a probe 38A according to a first modified embodiment will be described. In the description of the probe 38A, constituent elements having the structure identical to that of the probe 38 are labeled with the same reference numerals, and description thereof is omitted. Further, in the probe 38A, the structure similar to that of the probe 38 offers similar effects and advantages.

Figure 6A:
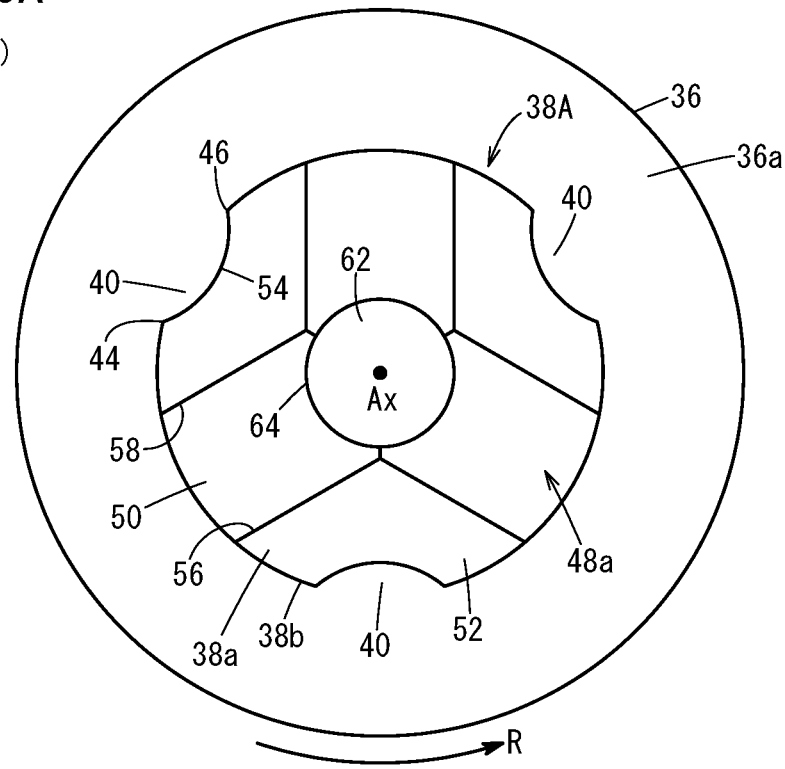
FIG. 6A is a view where a friction stir welding tool including a probe according to a first modified embodiment is viewed from a front end.

As shown in FIG. 6A, a front end recess 48a formed in the front end surface 38a of the probe 38A includes a central recess 62 positioned at the center of the front end surface 38a, and a plurality of (three in the illustrated embodiment) front end grooves 50 extending straight from the central recess 62 to the outer circumferential surface 38b. The front end recess 48a is rotationally symmetrical about the rotation axis Ax.

The central recess 62 has a circular shape as viewed from the front end of the probe 38A. The cross sectional shape of the wall surface of the central recess 62 taken along the rotation axis Ax has a circular arc shape. It should be noted that the cross sectional shape of the wall surface of the central recess 62 can be determined as necessary, and may be a U-shape or a V-shape, etc. The groove width of the front end groove 50 has the same length as the diameter of the central recess 62. The groove width of the front end groove 50 is the same as the groove width of the outer circumferential recess 40.

The probe 38A has, formed on the front end surface 38a, outer front end edges 54, first groove edges 56, second groove edges 58, and a third groove edge 64. The third groove edge 64 forms a border between the wall surface of the central recess 62 and the wall surface of the front end groove 50. The third groove edge 64 is coupled to an inner end of the first groove edge 56 and an inner end of the second groove edge 58.

In this modified embodiment, the front end recess 48a includes the central recess 62 positioned at the center of the front end surface 38a, and the front end grooves 50 extending in the radially outward direction of the probe 38A from the central recess 62 to the outer circumferential surface 38b.

In the structure, it is possible to guide the first softened material 104 present on the lateral side of the probe 38A from the front end groove 50 to the central recess 62, and store the first softened material 104 in the central recess 62. Therefore, it is possible to stirs the first softened material 104 and the second softened material 106 in the front end direction at the central part of the probe 38A more effectively.

The central recess 62 has a circular shape as viewed from the front end of the probe 38A, and the groove width of the front end groove 50 has the same length as the diameter of the central recess 62.

In the structure, it is possible to comparatively increase the quantity of the first softened material 104 flowing through the front end groove 50.

Second Modified Embodiment

Next, a probe 38B according to a second modified embodiment will be described. In the description of the probe 38B, constituent elements having the structure identical to that of the probe 38A are labeled with the same reference numerals, and description thereof is omitted. Further, in the probe 38B, the structure similar to that of the probe 38A offers similar effects and advantages.

Figure 6B:
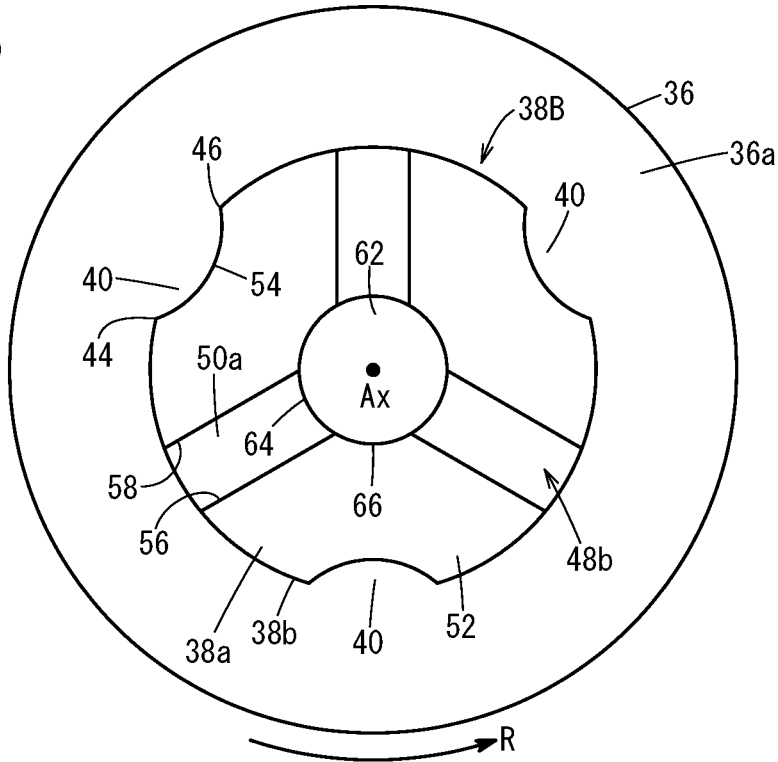
FIG. 6B is a view where a friction stir welding tool including a probe according to a second modified embodiment is viewed from a front end.

As shown in FIG. 6B, a front end recess 48b formed in the front end surface 38a of the probe 38B includes narrow front end grooves 50a instead of the front end grooves 50. The groove width of the front end groove 50a is smaller than the groove width of the outer circumferential recess 40. Further, the groove width of the front end groove 50a is smaller than the diameter of the central recess 62.

Outer front end edges 54, first groove edges 56, second groove edges 58, third groove edges 64, and inner front end edges 66 are formed in the front end surface 38a of the probe 38B. The inner front end edge 66 forms a border between the wall surface of the central recess 62 and the front end surface of the claw 52.

In this modified embodiment, the central recess 62 is formed to have a circular shape as viewed from the front end of the probe 38B, and the groove width of the front end groove 50a is smaller than the diameter of the central recess 62.

In the structure, since it is possible to form the claw 52 to have a comparatively large thickness, it is possible to improve the rigidity (strength) of the claw 52. Further, it is possible to increase the flow rate of the first softened material 104 flowing through the front end groove 50a. In the structure, since it is possible to generate plastic flow of the first softened material 104 in the front end direction of the probe 38B efficiently, it is possible to improve the welding speed.

Third Modified Embodiment

Next, a probe 38C according to a third modified embodiment will be described. In the description of the probe 38C, constituent elements having the structure identical to that of the probe 38 are labeled with the same reference numerals, and description thereof is omitted. Further, in the probe 38C, the structure similar to that of the probe 38 offers similar effects and advantages.

Figure 7:
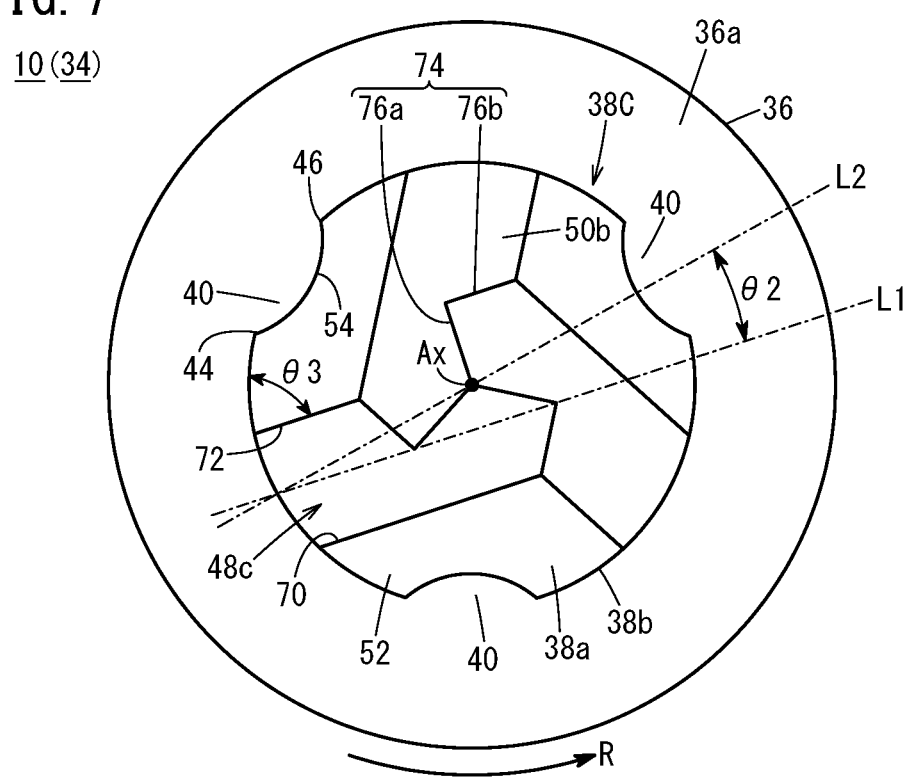
FIG. 7 is a view where a friction stir welding tool including a probe according to a third modified embodiment is viewed from a front end.

As shown in FIG. 7, a front end recess 48c formed in the front end surface 38a of the probe 38C includes a plurality of front end grooves 50b (three in the illustrated embodiment) extending straight from the outer circumferential recesses 40 toward positions shifted from the center of the front end surface 38a of the probe 38C (rotation axis Ax) in a manner that the front end grooves 50b intersect with each other. The front end recess 48c is rotationally symmetrical about the rotation axis Ax.

As viewed from the front end of the probe 38C, the front end grooves 50b extend straight in a manner that the central line L1 of each of the front end grooves 50b passes through a position shifted from the center of the front end surface 38a of the probe 38C (rotation axis Ax). An angle (shift angle θ2 of the front end groove 50b) formed between a line segment L2 which connects the intersection in the central line L1 with the outer circumferential surface 38b and the center of the front end surface 38a (rotation axis Ax), and the central line L1 can be set as necessary. The front end groove 50b is positioned between the outer circumferential recesses 40 that are adjacent to each other in the circumferential direction of the probe 38C.

The plurality of front end grooves 50b have the same structure. The wall surface of the front end groove 50b has a circular shape in lateral cross section. It should be noted that the lateral cross sectional shape of the wall surface of the front end groove 50b can be set as necessary, and may be a U-shape, or a V-shape, etc.

The front end surface 38a of the probe 38C includes an outer front end edge 54, a first groove edge 70, a second groove edge 72, and a third groove edge 74. The first groove edge 70 forms a side edge portion of the front end groove 50b that is positioned on the forward side in the rotation direction of the probe 38C (in the direction indicated by the arrow R).

The second groove edge 72 forms another side edge portion of the front end groove 50b that is positioned on the rearward side in the rotation direction of the probe 38C (in the direction opposite to the direction indicated by the arrow R). The first groove edge 70 and the second groove edge 72 extend in parallel to each other on both sides of the front end groove 50b. In the front end grooves 50b that are adjacent to each other, the inner end, which is positioned on the central side of the probe 38C, of the first groove edge 70 of one of the front end grooves 50b is coupled to the inner end, which is positioned on the central side of the probe 38C, of the second groove edge 72 of the other of the front end grooves 50b. The entire length of the second groove edge 72 is smaller than the entire length of the first groove edge 70. As viewed from the front end of the probe 38C, the central line L1 of the front end groove 50b is positioned closer to the first groove edge 70 of the front end groove 50b, compared with the center of the front end surface 38a (rotation axis Ax).

The third groove edge 74 is a ridge line extending from the center of the front end surface 38a to separate the front end grooves 50b which are adjacent to each other. The third groove edge 74 forms an edge portion of the front end groove 50b in a direction in which the front end groove 50b extends, and also forms part of a side edge portion of the adjacent front end groove 50b. The third groove edge 74 includes a first straight part 76a extending from the center of the front end surface 38a and a second straight part 76b extending from a coupling part of the first groove edge 70 and the second groove edge 72 to the first straight part 76a. The first straight part 76a and the second straight part 76b have the same length. Stated otherwise, the intersection between the first straight part 76a and the second straight part 76b is positioned at an extended end of the front end groove 50b.

In this modified embodiment, the front end recess 48c includes the plurality of front end grooves 50b formed in the front end surface 38a in a manner to intersect with each other. As viewed from the front end of the probe 38C, the front end groove 50b extends straight in a manner that the central line L1 of the front end groove 50b passes through a position shifted from the center of the front end surface 38a of the probe 38C. The front end surface 38a has the claw 52 formed between the front end grooves 50b that are adjacent to each other in the circumferential direction of the probe 38C.

In the structure, by adjusting the shift amount (shift angle θ2) between the center of the front end surface 38a of the probe 38C and the central line L1 of the front end groove 50b, it is possible to change the shape of the claw 52 (improve flexibility in designing the shape of the claw 52). Specifically, as the shift angle θ2 decreases, a corner of the claw 52 that is positioned on the forward side in the rotation direction of the probe 38C (in the direction indicated by the arrow R) becomes smaller (i.e., angle θ3 formed between the outer circumferential surface 38b of the probe 38C and the second groove edge 72 decreases). In this case, the performance of machining the workpiece W by the claw 52 is improved. On the other hand, as the shift angle θ2 increases, the angle θ3 formed therebetween increases. In this case, since it is possible to improve the rigidity (strength) of the claw 52, the durability of the probe 38C is improved.

The front end surface 38a has, formed thereon, the third groove edge 74 extending from the center of the front end surface 38a in a manner to separate the front end grooves 50b that are adjacent to each other.

In the structure, the first softened material 104 flowing through the front end groove 50b comes up against the third groove edge 74 and is then guided toward the front end of the probe 38C. In this manner, it is possible to stir the first softened material 104 and the second softened material 106 on the front end side of the probe 38C more effectively.

In the probe 38C according to the modified embodiment, as viewed from the front end of the probe 38C, the central line L1 of the front end groove 50b may be positioned closer to the second groove edge 72 of the front end groove 50b, compared with the center of the front end surface 38a (rotation axis Ax). In this case, as the shift angle θ2 decreases, the angle θ3 formed between the outer circumferential surface 38b of the probe 38C and the second groove edge 72 increases, and as the shift angle θ2 increases, the angle θ3 formed therebetween decreases.

The present invention is not limited to the above described embodiments. It is a matter of course that various modifications may be made without departing from the gist of the present invention.

The welding tool 10 may be configured to perform lap welding of a workpiece W which comprises three or more plate members that are stacked together. The welding tool 10 may be used in butt welding, where end surfaces of two plate members are brought into abutment with each other, and the abutting portions are welded together by friction stir welding. The sizes, the shapes, the positions, and the numbers of the outer circumferential recesses 40, and the front end grooves 50, 50a, 50b can be changed as necessary.

The above embodiments are summarized as follows:

The above embodiments disclose the friction stir welding tool (10). The friction stir welding tool (10) includes the probe (38, 38A to 38C) having the front end surface (38a) and the outer circumferential surface (38b). The outer circumferential surface (38b) has, formed therein, the outer circumferential recess (40) extending to the front end surface (38a), and the friction stir welding tool (10) is configured to rotate the probe (38, 38A to 38C) about the rotation axis (Ax) and embed the probe (38, 38A to 38C) inside the workpiece (W) during rotation of the probe (38, 38A to 38C) to thereby weld the workpiece (W). The front end recess (48, 48a to 48c) is formed in the front end surface (38a), and the front end recess (48, 48a to 48c) extends to the outer circumferential surface (38b) in a manner that the front end recess (48, 48a to 48c) does not communicate with the outer circumferential recess (40).

In the above described friction stir welding tool (10), the front end recess (48) may include the front end groove (50), and the front end groove (50) may extend in a radially outward direction of the probe (38) from the center of the front end surface (38a) to the outer circumferential surface (38b).

In the above described friction stir welding tool (10), the front end groove (50) may include the plurality of front end grooves, and the front end surface (38a) may include the ridge line (60) in a manner that the ridge line (60) extends from the center of the front end surface (38a) so as to separate the front end grooves (50) that are adjacent to each other.

In the above described friction stir welding tool (10), the outer circumferential recess (40) may include the plurality of outer circumferential recesses provided in a circumferential direction of the probe (38), and each of the front end grooves (50) is positioned between the outer circumferential recesses (40) that are adjacent to each other.

In the above described friction stir welding tool (10), the front end recess (48a, 48b) may include the central recess (62) provided at the center of the front end surface (38a), and the front end groove (50, 50a) extending in the radially outward direction of the probe (38A, 38B) from the central recess (62) to the outer circumferential surface (38b).

In the above described friction stir welding tool (10), the central recess (62) may have a circular shape as viewed from the front end of the probe (38A), and the groove width of the front end groove (50) may have the same length as the diameter of the central recess (62).

In the above described friction stir welding tool (10), the central recess (62) may have a circular shape as viewed from the front end of the probe (38B), and the groove width of the front end groove (50) may be smaller than the diameter of the central recess (62).

In the above described friction stir welding tool (10), the front end recess (48c) may include the plurality of front end grooves (50b) formed in the front end surface (38a) in a manner to intersect with each other, the front end grooves (50b) may extend straight in a manner that, as viewed from a front end of the probe (38C), the central line (L1) of each of the front end grooves (50b) passes through a position shifted from the center of the front end surface (38a) of the probe (38C), and the front end surface (38a) may include the claw (52) formed between the front end grooves (50b) that are adjacent to each other in the circumferential direction of the probe (38C).

In the above described friction stir welding tool (10), the front end surface (38a) may include the ridge line (74) formed thereon in a manner that the ridge line (74) extends from the center of the front end surface (38a) so as to separate the front end grooves (50b) that are adjacent to each other.

What is claimed is:

1. A friction stir welding tool comprising a probe having a front end surface and an outer circumferential surface, the outer circumferential surface including, formed therein, an outer circumferential recess extending to the front end surface, the friction stir welding tool being configured to rotate the probe about a rotation axis and embed the probe inside a workpiece during rotation of the probe to thereby weld the workpiece,
   wherein a front end recess is formed in the front end surface, and the front end recess extends to the outer circumferential surface in a manner that the front end recess does not communicate with the outer circumferential recess,
   the front end recess includes a front end groove, and the front end groove extends in a radially outward direction of the probe from a center of the front end surface to the outer circumferential surface, and
   the front end recess is edged.

2. The friction stir welding tool according to claim 1, wherein the front end groove comprises a plurality of front end grooves; and
   the front end surface includes a ridge line in a manner that the ridge line extends from the center of the front end surface so as to separate the front end grooves that are adjacent to each other.

3. The friction stir welding tool according to claim 2, wherein the outer circumferential recess comprises a plurality of outer circumferential recesses provided in a circumferential direction of the probe, and each of the front end grooves is positioned between the outer circumferential recesses that are adjacent to each other.

4. A friction stir welding tool comprising a probe having a front end surface and an outer circumferential surface, the outer circumferential surface including, formed therein, an outer circumferential recess extending to the front end surface, the friction stir welding tool being configured to rotate the probe about a rotation axis and embed the probe inside a workpiece during rotation of the probe to thereby weld the workpiece,
   wherein a front end recess is formed in the front end surface, and the front end recess extends to the outer circumferential surface in a manner that the front end recess does not communicate with the outer circumferential recess,
   wherein the front end recess comprises:
   a central recess provided at a center of the front end surface;
   a front end groove extending in a radially outward direction of the probe from the central recess to the outer circumferential surface, and
   the front end recess is edged.

5. The friction stir welding tool according to claim 4, wherein the central recess has a circular shape as viewed from a front end of the probe; and
   a groove width of the front end groove has a same length as a diameter of the central recess.

6. The friction stir welding tool according to claim 4, wherein the central recess has a circular shape as viewed from a front end of the probe; and
   a groove width of the front end groove is smaller than a diameter of the central recess.

7. A friction stir welding tool comprising a probe having a front end surface and an outer circumferential surface, the outer circumferential surface including, formed therein, an outer circumferential recess extending to the front end surface, the friction stir welding tool being configured to rotate the probe about a rotation axis and embed the probe inside a workpiece during rotation of the probe to thereby weld the workpiece, wherein a front end recess is formed in the front end surface, and the front end recess extends to the outer circumferential surface in a manner that the front end recess does not communicate with the outer circumferential recess, wherein the front end recess comprises a plurality of front end grooves formed in the front end surface in a manner to intersect with each other;

the front end grooves extend straight in a manner that, as viewed from a front end of the probe, a central line of each of the front end grooves passes through a position shifted from a center of the front end surface of the probe;

the front end surface includes a claw formed between the front end grooves that are adjacent to each other in a circumferential direction of the probe, and the front end recess is edged.

8. The friction stir welding tool according to claim 7, wherein the front end surface includes a ridge line formed thereon in a manner that the ridge line extends from the center of the front end surface so as to separate the front end grooves that are adjacent to each other.

\* \* \* \* \*